United States Patent [19]

Gerhardinger et al.

[11] Patent Number: 4,804,579
[45] Date of Patent: Feb. 14, 1989

[54] THERMOINSULATING MOLDINGS CONTAINING A POROUS, INORGANIC THERMOINSULATING MATERIAL AND HAVING AN ORGANOPOLYSILOXANE COATING THEREON

[75] Inventors: Dieter Gerhardinger, Burghausen; Johannes Reisacher, Kempten; Günter Stohr, Durach; Karl-Heinrich Wegehaupt, Burghausen, all of Fed. Rep. of Germany

[73] Assignee: Wacker-Chemie GmbH, Munich, Fed. Rep. of Germany

[21] Appl. No.: 161,699

[22] Filed: Feb. 29, 1988

[30] Foreign Application Priority Data

Mar. 26, 1987 [DE] Fed. Rep. of Germany ....... 3709864

[51] Int. Cl.$^4$ ................................................. B32B 3/26
[52] U.S. Cl. .................................. 428/304.4; 428/447
[58] Field of Search .............................. 428/304.4, 447

[56] References Cited

U.S. PATENT DOCUMENTS

| | | | |
|---|---|---|---|
| 4,209,432 | 6/1980 | Roth | 524/262 |
| 4,212,925 | 7/1980 | Kratel et al. | 428/447 |
| 4,258,099 | 3/1981 | Narumiya | 428/304.4 |
| 4,395,456 | 7/1983 | Jackson et al. | 428/304.4 |
| 4,600,657 | 7/1986 | Haupt et al. | 428/447 |
| 4,602,922 | 7/1986 | Cabasso et al. | 428/304.4 |

FOREIGN PATENT DOCUMENTS

| | | |
|---|---|---|
| 0002502 | 6/1979 | European Pat. Off. . |
| 0153500 | 9/1985 | European Pat. Off. . |
| 2558184 | 7/1977 | Fed. Rep. of Germany . |
| 3144011 | 5/1983 | Fed. Rep. of Germany . |

*Primary Examiner*—Morton Foelak

[57] ABSTRACT

The invention relates to thermoinsulating moldings containing porous, inorganic thermoinsulating materials and having an organopolysiloxane coating thereon, in which an uncoated thermoinsulating molding is coated with a diorganopolysiloxane containing rod-shaped styrene-(meth)acrylate copolymers which are obtained from a free radical copolymerization of styrene and (meth)acrylate in the presence of the diorganopolysiloxane.

1 Claim, No Drawings

THERMOINSULATING MOLDINGS CONTAINING A POROUS, INORGANIC THERMOINSULATING MATERIAL AND HAVING AN ORGANOPOLYSILOXANE COATING THEREON

The present invention relates to thermoinsulating moldings, and more particularly to thermoinsulating moldings containing porous, inorganic thermoinsulating material having an organopolysiloxane coating thereon.

BACKGROUND OF THE INVENTION

It is known from European Patent Application No. 90,883 that insulating moldings which contain a press-molded mixture of a finely divided component such as pyrogenically produced silicon dioxide, an opacifier and a high temperature stable fiber, can be coated with an aqueous suspension which contains, in addition to water, a mixture of bentonite and inorganic fibers. The thermoinsulating materials thus treated can additionally have one or more coatings based on organic or inorganic surface-coating systems, silicone compositions or low-melting glazes. According to European Patent Application No. 90,883, direct application of the organic or inorganic coatings onto such thermoinsulating materials without coating with the aqueous suspension is not possible.

Surprisingly, we have found that thermoinsulating moldings containing porous, inorganic thermoinsulating materials having an adherent and durable organopolysiloxane coating thereon can be obtained without pre-coating the thermoinsulating molding, with the aqueous suspension described in European Patent Application 90,883.

It is an object of the present invention to provide thermoinsulating moldings based on a porous, inorganic thermoinsulating material which are resistant to mechanical influences such as abrasion, dirt pick-up and moisture and liquids. Another object of the present invention is to provide thermoinsulating moldings based on porous, inorganic thermoinsulating material having a coating thereon which is resistant to abrasion, moisture and liquids. A further object of the present invention is to provide thermoinsulating moldings having an adherent, durable and electroinsulating coating thereon.

SUMMARY OF THE INVENTION

The foregoing objects and others which will become apparent from the following description are accomplished in accordance with this invention, generally speaking, by providing thermoinsulating moldings based on porous, inorganic thermoinsulating materials and having an organopolysiloxane coating thereon, in which the thermoinsulating molding is coated with an organopolysiloxane composition containing diorganopolysiloxanes which crosslink to form elastomers and contains rodshaped styrene-(meth)acrylate copolymers which are obtained from free radical copolymerization of styrene and (meth)acrylates in the presence of the diorganopolysiloxanes.

DESCRIPTION OF THE INVENTION

Thermoinsulating moldings containing porous, inorganic thermoinsulating materials have been described heretofore and, therefore, need not be described in greater detail. In accordance with the present invention, thermoinsulating materials based on alkali metal silicate solutions, such as described in German Auslegeschrift No. 1,201,227, or based on sodium aluminates, such as described in Japanese Patent Application No. 45-28,637, are preferably employed. It is, however, preferred that thermoinsulating moldings based on press-molded microporous thermoinsulating materials are preferably finely divided metal oxides, of which the following is a typical composition which has proved satisfactory as a thermoinsulating material:

30 to 100 percent by weight of finely divided metal oxide
0 to 30 percent by weight of opacifier
0 to 20 percent by weight of fiber material
0 to 15 percent by weight of inorganic binder.

The binder portion is preferably present in an amount of from 0.3 to 1.5 percent by weight based on the weight of the composition.

Examples of finely divided metal oxides are pyrogenically produced silicas, such as arc silicas, low-alkali precipitated silicas, similarly prepared aluminum oxide, titanium oxide and zirconium oxide, and mixtures of at least two of these metal oxides. The finely divided metal oxides have specific surface areas of from 50 to 700 $m^2/g$, and more preferably from 70 to 400 $m^2/g$.

Opacifiers which may be employed are ilmenite, titanium dioxide, iron(II)/iron(III) mixed oxides, chromium dioxide, zirconium oxide, zirconium silicate, manganese oxide and iron xxide. The opacifiers preferably have an absorption maximum in the infra-red region between 1.5 and 10 um.

Examples of fiber materials are glass wool, rock wool, slag wool, ceramic fibers, which are obtained from melts of aluminum oxide and/or silicon oxide, asbestos fibers and others.

Inorganic binders which may be employed are, for example, the borides of aluminum, of titanium, of zirconium or of calcium, silicides, such as calcium silicide and calcium/aluminum silicide, and in particular boron carbide. Examples of additional components which may be employed are basic oxides, especially magnesium oxide, calcium oxide or barium oxide.

The thermoinsulating moldings of this invention are usually formed as sheets, profiles, tubes, circular segments and as molded articles of regular and irregular geometry. Further shaping elements which may be mentioned are bevelled edges, notches and grooves.

The thermoinsulating moldings based on a porous inorganic insulating material are coated in accordance with this invention with an organopolysiloxane composition which crosslinks to form elastomers and contains rod-shaped styrene(meth)acrylate copolymers which are obtained from the free radical copolymerization of styrene and (meth)acrylates in the presence of the organopolysiloxane.

The compositions which are applied to the thermoinsulating moldings in accordance with this invention, are based on diorganopolysiloxanes which crosslink to form elastomers and contain a rod-shaped styrene-(meth)acrylate copolymer which is formed by the free radical copolymerization of styrene and (meth)acrylates in the presence of the diorganopolysiloxanes, are described, for example, in U.S. Pat. No. 3,555,109 to Getson, U.S. Pat. No. 3,776,875 to Getson and U.S. Pat. No. 4,032,499 to Kreuzer et al, and are incorporated herein by reference. The organopolysiloxane compositions are the so-called single-component compositions which crosslink via polyfunctional and easily hydrolyzable silicon compounds under the influence of atmospheric moisture.

The amount of diorganopolysiloxane is preferably from 20 to 60 percent by weight, based on the total weight of diorganopolysiloxane and styrene-(meth)acrylate copolymer. It is furthermore preferred that the styrene-(meth)acrylate copolymer which is produced in the presence of the diorganopolysiloxane is composed of from 35 to 70 percent by weight of units which are derived from styrene and the remainder of the units which are derived from (meth)acrylates. The copolymers which are formed in the presence of the diorganopolysiloxane are preferably those made from styrene and n-butyl acrylate. However, n-butyl acrylate can also be replaced, at least partially, by, for example, methyl acrylate, ethyl acrylate, npropyl acrylate, isopropyl acrylate, sec-butyl acrylate, methyl methacrylate, ethyl methacrylate, n-propyl methacrylate, isopropyl methacrylate, n-butyl methacrylate or secbutyl methacrylate, or by a mixture of at least two of these (meth)acrylates. It is preferred that at least 80 percent of the SiC-bonded organic radicals of the diorganopolysiloxanes in whose presence the styrene-(meth)acrylate copolymers are produced are preferably methyl radicals, because of their availability. The diorganopolysiloxanes preferably have a viscosity of from 8,000 to 60,000 mPa.s at 25° C.

The compositions which crosslink to form elastomers and are reacted in accordance with this invention can optionally contain substances in addition to crosslinking agents such as methyltris-(methyl ethyl ketoximo)-silane and crosslinking catalysts such as di-n-butyltin dilaurate. Examples of such substances are fillers, such as pyrogenically produced silicon dioxide, solvents, such as alkane mixtures, thickeners, such as thixotropic additives and pigments. The compositions which crosslink to form elastomers and are reacted in accordance with this invention preferably also contain adhesion promoters, such as amino-containing silanes. Particularly suitable adhesion promoters are silanes which contain at least one amine group per molecule, which is bonded to silicon via carbon and at least one monovalent, optionally amino- or alkoxy-substituted hydrocarbon radical which is bonded to silicon via oxygen, and/or partial hydrolyzates of such silanes. Examples of such silanes are CH$_3$Si(OCH$_2$CH$_2$NH$_2$)$_2$(CH$_2$)$_3$O(CH$_2$)$_2$NH$_2$,
(CH$_3$O)$_3$Si(CH$_2$)$_3$NH(CH$_2$)$_2$NH$_2$,
H$_2$N(CH$_2$)$_2$O(CH$_2$)$_3$Si(OCH$_2$CH$_2$NH$_2$)$_3$,
N-β-aminoethyl-γ-aminopropyltriethoxysilane,
β-aminoethyltriethoxysilane,
N-β-aminoethyl-δ-aminobutyltriethoxysilane,
γ-aminopropyltriethoxysilane,
Aminomethyltriethoxysilane,
N-β-aminoethyl-γ-aminopropyltris-(methoxyethyleneoxy)-silane,
δ-aminobutyltriethoxysilane, and also compounds of the general formula H$_2$N(CH$_2$)$_2$NH(CH$_2$)$_3$Si(OR)$_3$, where R is an alkyl radical having from 1 to 5 carbon atoms per radical or a methoxyethylene radical.

The coatings of this invention preferably have a thickness of from 100 to 400 um, and more preferably from 200 to 300 um.

The coating of this invention can be applied in any manner which is suitable for applying liquid or pasty substances to moldings, for example, by dip-coating, spraying, brushing, pouring or rolling. After the compositions have been applied to the thermoinsulating moldings, the compositions crosslink to form organopolysiloxane elastomers. This crosslinking takes place at room temperature. It can be accelerated by warming, for example, to from 50° to 150° C., and more preferably about 70° C., for example, by induction heat.

EXAMPLE

A thermoinsulating sheet comprising a press-molded microporous material consisting of 62.5 percent by weight of pyrogenically produced silicon dioxide, 31.7 percent by weight of ilmenite, 5.0 percent by weight of aluminum silicate fibers, and 0.8 percent by weight of boron carbide was coated with a composition which crosslinks to form an elastomer. The composition consisted of 89 parts by weight of a composition containing 53 parts by weight of a composition having a viscosity of 50,000 mPa.s at 25° C., containing 30 percent by weight of dimethylpolysiloxane, 70 percent by weight of a copolymer (55 percent by weight of styrene and 45 percent by weight of nbutyl acrylate), 35.5 parts by weight of an alkane mixture (boiling point 140° to 160° C./1.0013 mbar) and 0.5 parts by weight of highly dispersed silica having a BET surface area of 200 m2/g, 3 parts by weight of toluene, 5 parts by weight of methyltri-(butanoneoximo)silane, 3 parts by weight of aminoethylaminopropyltriethoxysilane, and 0.05 part by weight of dibutyltin diacetate. The composition, which has a viscosity of 5,000 mPa.s, measured according to a Brookfield viscometer using spindle 2 at 2.5 rpm, can be stored in a closed vessel in the absence of moisture. The coating was applied by means of an airless apparatus or a compressed air sprayer. The coating was crosslinked in the presence of atmospheric moisture over a period of about 2 hours. A coating thickness of 250 um was obtained.

What is claimed is:

1. A thermoinsulating molding comprised of porous, inorganic thermoinsulating materials and having an organopolysiloxane coating thereon, in which the thermoinsulating molding is coated with a crosslinked elastomeric composition containing diorganopolysiloxanes, and rod-shaped styrene-(meth)acrylate copolymers which are obtained from the free radical copolymerization of styrene and (meth)acrylates in the presence of the diorganopolysiloxanes.

* * * * *